United States Patent [19]
Schmitt

[11] 3,771,298
[45] Nov. 13, 1973

[54] COMBINES

[76] Inventor: Helwig Schmitt, Raiffeisenstr. 5, Grebenstein, Germany

[22] Filed: Jan. 17, 1972

[21] Appl. No.: 218,336

[52] U.S. Cl. ...................... 56/14.6, 56/12.8, 56/208, 130/27 F, 130/27 HF, 130/27 T
[51] Int. Cl. ............................................. A01d 41/04
[58] Field of Search ................... 56/10.4, 14.6, 208, 56/12.8; 130/27 H, 27 HF, 27 T, 27 F

[56] References Cited
UNITED STATES PATENTS

| | | | |
|---|---|---|---|
| 3,623,302 | 11/1971 | Schmitt | 56/14.6 |
| 3,286,448 | 11/1966 | Moore | 56/208 |
| 2,835,256 | 5/1958 | Rogers et al. | 130/27 HF |

*Primary Examiner*—F. Barry Shay
*Assistant Examiner*—J. A. Oliff
*Attorney*—Stein & Orman

[57] ABSTRACT

A combine structure comprising a conveyor cylinder located in spaced relation to a cutter bar wherein crops cut with a cutter bar is transported by the conveyor cylinder to a threshing cylinder by means of conveyor elements located on the external side or surface of the conveyor cylinder. The threshing cylinder may be adapted in the shape of a radial blower thereby serving not only to thresh the freshly harvested crop but also to direct a stream of air into additional conveyor elements located on the interior of the conveyor cylinder. The threshed crop is thereby transported to the interior of the conveyor cylinder where residual grain is separated therefrom and channeled accordingly. Additional conveyor elements are located on a table pan rearwardly on the cutter blade so as to aid in the delivery of the cut crop to the threshing cylinder.

13 Claims, 11 Drawing Figures

Fig. 1
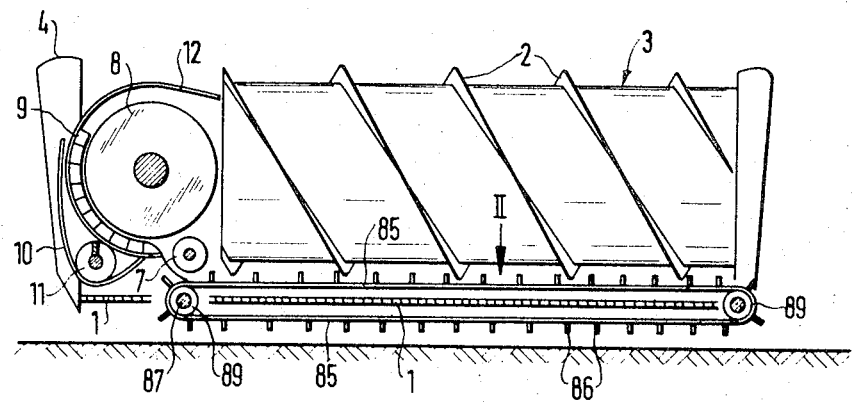
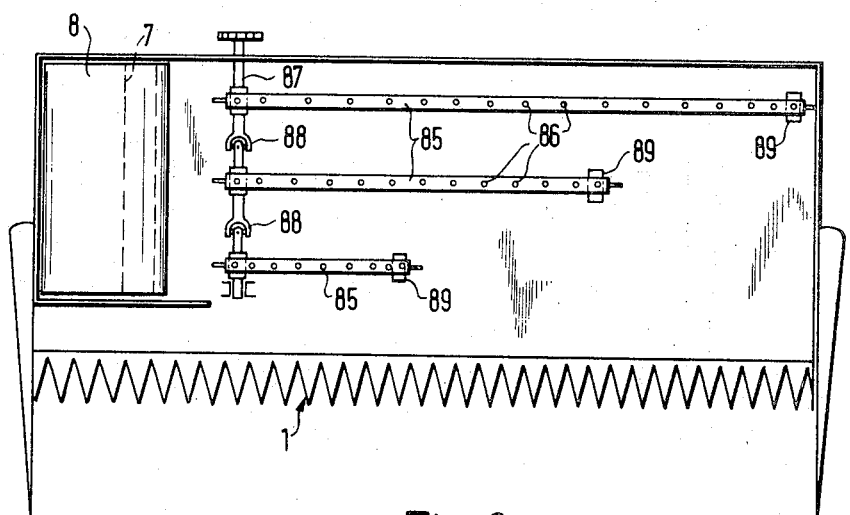
Fig. 2

3,771,298

COMBINES

RELATED APPLICATION

An application on the subject application was first filed by applicant in Germany on Jan. 15, 1971 and by virtue of such foreign application a right of priority is hereby claimed.

Field of the Invention

This invention relates to a combine structure having a plurality of conveyor means mounted thereon to facilitate transporting or conveying of the cut crop through the combine structure wherein at least one of the conveyor means further serve to separate residual grain from the remainder of the harvesting crop.

SUMMARY OF THE INVENTION

The present invention relates to a combine structure including a grain-straw conveyor cylinder comprising a plurality of conveyor elements arranged on its lower or external side so as to convey a cut crop towards a threshing cylinder. The threshing cylinder is located adjacent one end of the conveyor cylinder and when passing therefrom is transported from the threshing cylinder, by his upper or internal sides which are primarily designed to convey or transport both threshed straw and residual grain coming therefrom. The conveyor included in the combine structure further includes additional conveying devices other than the grain and straw conveyor, which are positioned between a cutter bar and the conveyor cylinder as well as between a stationary table pan located beneath the conveyor cylinder and behind the cutter bar.

The threshing cylinder in addition to its threshing function, may serve as a radial blower which is primarily designed to deliver the threshed straw and residual grain therefrom into the conveyor cylinder. A straw walker is located inside the grain and straw conveyor cylinder and is positioned to receive the cut crop from the blower or threshing cylinder.

One embodiment of the invention is a specific design of the rotating walker permitting the pneumatic effect of the threshing cylinder to lift the straw inside the straw walker from the rotating walker wall and convey it towards an exit therein. The rotating walker may be replaced by a swing-type walker which is also fitted inside the grain and straw conveyor cylinder or else by a plurality of several tray-type walkers fitted next to one another on supporting cranks allowing the tray-type walkers to be movably mounted therein.

Maintaining the cutting or harvesting elements of the combine relative to the contour of the ground over which the combine travels was previously done in the prior art by adjusting or modifying the operating height between the table on which the cutter bar is mounted and the remainder of the combine. However in the present invention the cutter bar is attached by a hinge means or a hinged type suspension bar to the table pan while the table pan is fixedly attached to the combine. The fluctuations in the position of the cutter bar by virtue of this hinge type suspension member serves to operate a control valve for adjusting the height of the combine and the table relative to the ground respectively.

Another feature of the present invention comprises gear means located on the conveyor cylinder which is also utilized to drive the harvesting wheel and any knives attached thereto by virtue of spurs gears or like gear elements interconnecting the gear means on the cylinder conveyor with the wheel.

The combine of the present invention is further capable of drying moist grain or cut crop, which mainly occurred during nighttime harvesting. This drying effect is made feasible through the use of the blower mechanism which may be an adapted part of the harvesting cylinder. More particularly, the rotating walkers located in the conveyor cylinder receives warm or hot air flow from the threshing cylinder when it is modified in the shape of a radially blower. This air flow may be transported by appropriate conduit means arranged in communicating relation between the blower and the interior of the conveyor cylinder.

The invention accordingly comprises the features of construction, combination of elements, and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which:

FIG. 1 shows the combine of the present invention equipped with cylindrical grain/straw conveyor, threshing mechanism and a time-carrying conveyor located in the table pan.

FIG. 2 is a top plan view of the table pan with time-carrying conveyor, front beater and threshing cylinder.

Similar reference characters refer to similar parts throughout the several views of the drawings.

DETAILED DESCRIPTION

Figure 3:
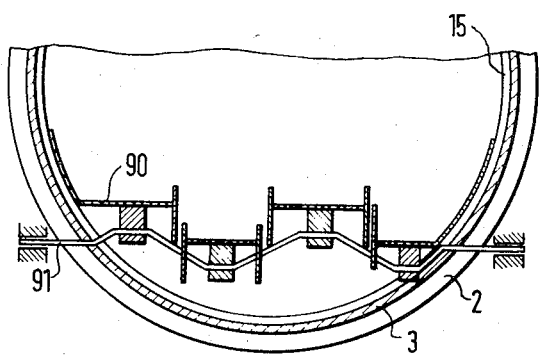
FIG. 3 is a sectional view along lines III—III of FIG. 4 of the tray type walker located inside the grain/staw conveyor.

In the combine shown in FIGS. 1 and 2, a crop is cut by means of cutter bar 1 and fed into a threshing cylinder 8 and a guide 9 by means of structure mounted on cylindrical grain/straw conveyor cylinder 3 and the conveying drum 7. To ensure an even feed across the entire width of the threshing cylinder, the crop coming from the cutter bar is guided through a table pan, which is installed behind the cutter bar 1, by one or several tine carrying belts 85 and the tines 86 attached thereto. The operating speed of the tine carrying belt 85 is the same as that of auger 2 on the grain/straw conveyor cylinder 3. The tine belt 85 is driven via shaft 87 which can adapt to the shape of the tab pan by universal joints 88. The shaft 87 is on the same level with the table pan located behind the cutter bar 1; therefore the side of the tine belt 85 feeding towards the cylinder 8 is located above the table pan while the opposite direction side is positioned beneath the table pan. The change in direction of tine belt 85 is made by shaft 87 and by means of the pulleys or sprockets, respectively, attached to the shafts 89. The tine belts 85 are of different lengths in order to ensure that the material coming from the cutter bar 1 is seized by the tine belts in about equal batches.

Figure 4:
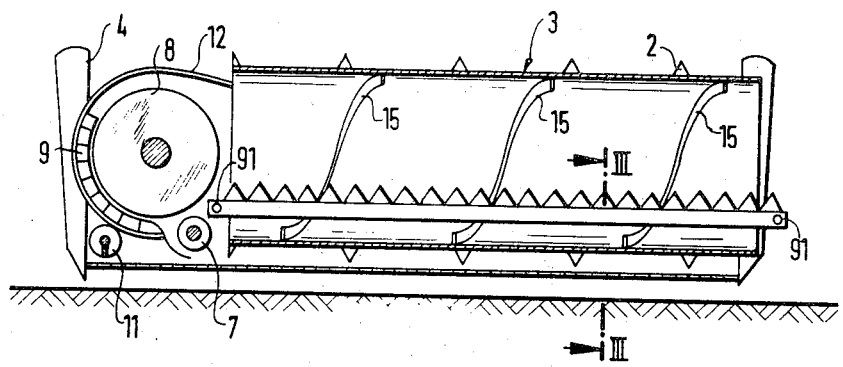
FIG. 4 is a front view of combine, with swing or tray type walker inside the grain/straw conveyor.

The embodiment of FIGS. 3 and 4 shows a swing type or tray type walker 90 positioned inside the rotating conveyor cylinder 3. Coming from the cylinder 8, the straw with the residual grains is fed by the defelector 12 into the grain/straw conveyor 3 and onto the swing type or tray type walker 90.

The tray type walkers 90 fitted on the cranks 91 are put into an oscillating movement causing the straw to be transported from the threshing cylinder 8 through the rotating conveyor cylinder 3 and, at the same time, separating the grains remaining in the straw through the sieve type surface of the walkers 90. The separated grains drop onto the inner wall of the rotating conveyor cylinder 3 and are taken by an internal auger 15 to one end of the grain/straw conveyor and by means of a scooping device into the flow of grains coming from the cylinder 9.

Figure 5:
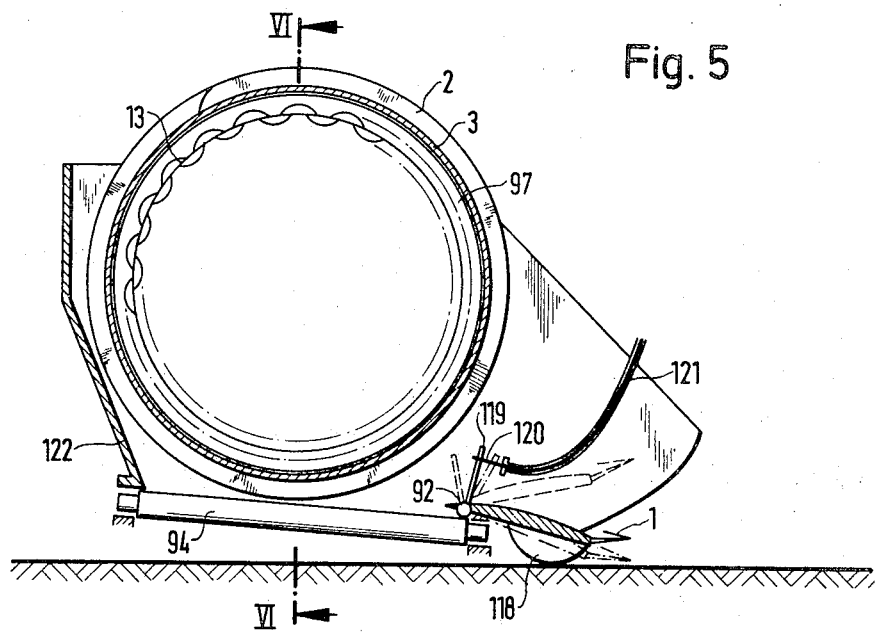
FIG. 5 shows a cylindrical grain/straw conveyor, with conveying belt working towards the threshing mechanism and cutter bar attached by hinge type suspension.
Figure 10:
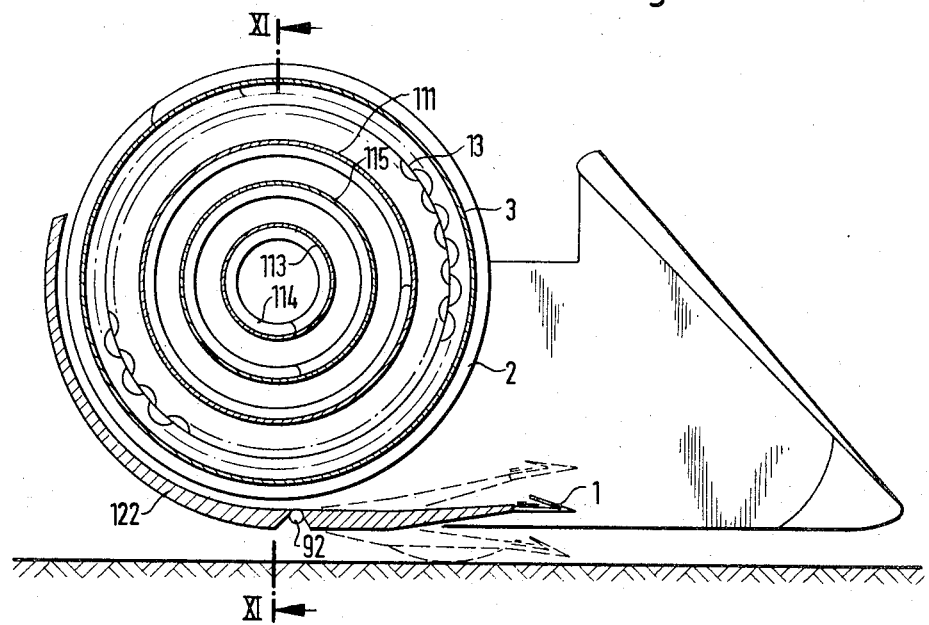
FIG. 10 is a cylindrical grain/straw conveyor with integrated piping system for drying of grain with the cutter bar attached to table pan by hinge type suspension.
Figure 11:
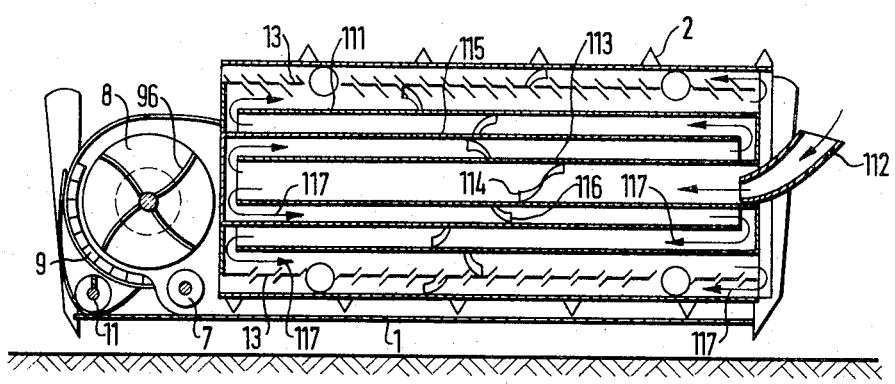
FIG. 11 is a sectional view taken along lines XI—XI of FIG. 10 with cylindrical grain/straw conveyor with integrated piping system and threshing cylinder of radial blower shape.

In FIGS. 5 and 10, the cutter bar 1 is attached by means of a hinge 92 to the bottom sump of the table or the combine, respectively. The combine structure of the present invention has control means including shoes 118, mounted on the underside of the cutter bar 1 and engageable with the ground so as to follow the contours thereof without modifying the position of the combine as a whole or the table 122.

In FIG. 5 the pitching motions of cutter bar 1 act on the lever 119 and the cable 120 of a Bowden device 121, which further comprise the control means of the present device, to operate the hydraulic control valve not shown for the hydraulic height adjustment of the table or the combine 122, respectively. The pre-set ground clearance of the table 122 or the combine is thus maintained in case of irregularities of the ground sensed by the cutter bar 1 attached to the hinge 92. By removing the hinge bolt 92, it is possible to separate the cutter bar from the combine or the table 122. It is then possible to attach to the hinge 92 other accessories for the combine, such as a pick-up device for swath removal, a picker head or a cutting device for harvesting grain-maize as well as different cutter bar versions.

Figure 6:
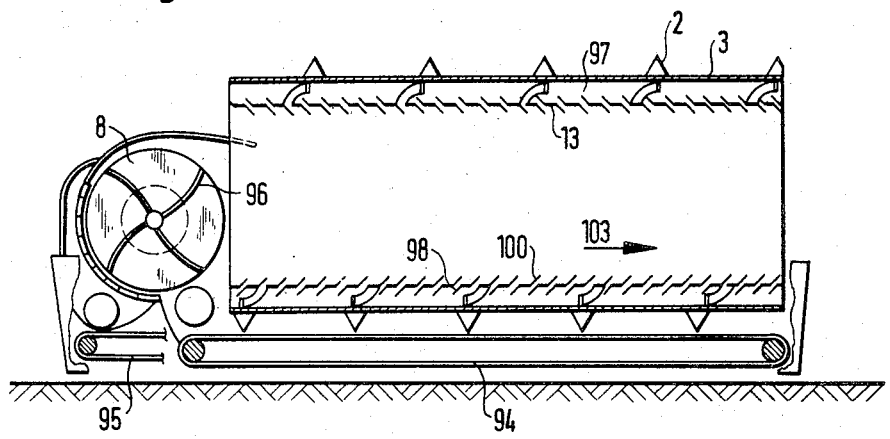
FIG. 6 is a front sectional view of combine taken along lines VI—VI of FIG. 5, with conveying belt beneath grain/staw conveyor, threshing cylinder shaped as radial blower, and cylindrical grain and straw conveyor.

In FIGS. 5 and 6, a revolving conveyor belt 94 of about the same width as the cylinder 8 is located beneath the grain/straw conveyor 3 to ensure more effective transportation of the crop towards the threshing cylinder. By its upper side conveying towards the threshing cylinder, this belt 94 will support the conveying and distributing effect of the auger 2 on the grain/straw conveyor 3 which conveys the grain coming from the cutter bar 1 to the cylinder 8. The conveying belt 95 positioned in front of the threshing cylinder 8 will transport the material cut by the cutter bar 1 to the grain/straw conveyor cylinder 3, i.e., in the opposite direction to the conveying belt 94.

FIG. 6 shows a threshing cylinder 8 which has been equipped with air scoops or blades 96 as in an impeller designed to function as a radial blower in addition to its threshing function.

The flow of air produced by these air scoops 96 is channeled into the rotating walker 13 inside the grain/straw conveyor 3 and serves to improve the passage of straw through that walker.

Owing to the specific shape of the wall of the rotating walker 13, the air directed from the cylinder 8 by air scoops 96 into the free space 97 between rotating walker 13 and outside wall of the grain/straw conveyor 3 is directed into the inside of walker 13. This passage of the air travels the wall of the walker 13 from outside inwards and any short straw particles and other residual particles found inside the walker 13 are carried outwards and thus do not hamper the return of the separated grain nor subsequently the cleaning plant. Furthermore, the straw which is forced by the rotation of the walker 13 against the wall, will be lifted off the wall by the air blown through the walker wall from the outside inwards. This lifting and loosening of the straw permits an improved separation of the grains contained inside such straw.

Figure 7:
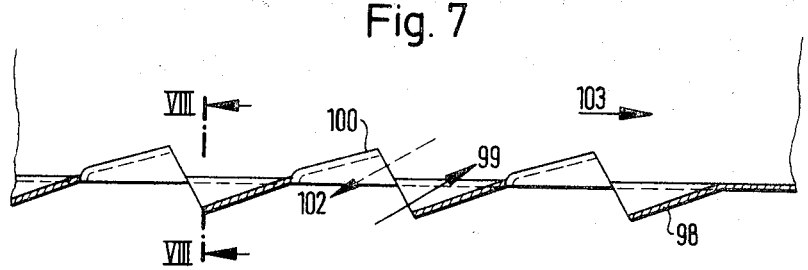
FIG. 7 is a sectional view of the wall of the rotating walker.
Figure 8:
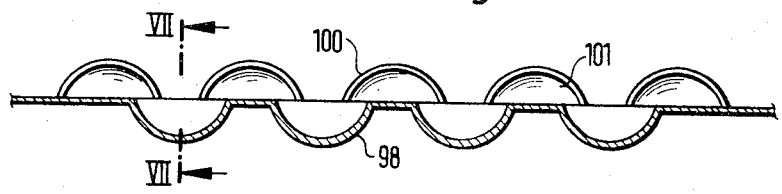
FIG. 8 is a sectional view taken along lines VIII—VIII of FIG. 7.

FIGS. 7 and 8 show a sectional view of one embodiment including a specifically shaped wall of the rotating walker 13. The flow of air produced by the threshing cylinder 8 is directed through the air barrier 98 in direction of the arrow 99 into the inside of walker 13. The grain pockets 100 located on the inner side of walker 13 permit the separated grains to fall through their exits 101 in direction of arrow 102 through the outside of the walker. The passage of the straw by the rotating walker 13 is made in the direction of arrow 103.

Figure 9:
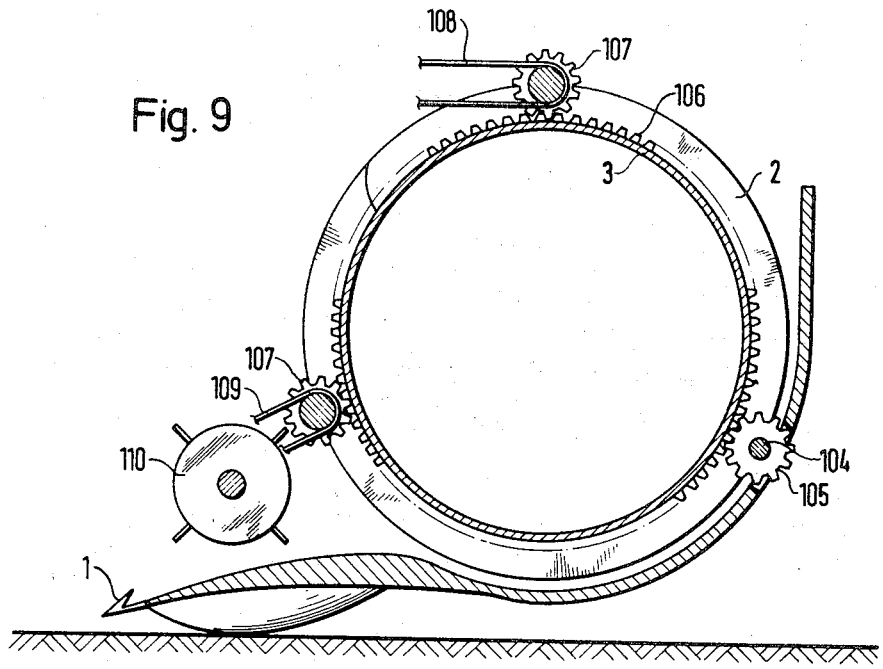
FIG. 9 is a rear rim or roller chain, respectively, located around cylindrical grain/straw conveyor, designed to assure the drive to the reel and the knives.

FIG. 9 shows the drive for the conveyor cylinder 3. The shaft 104 is driven by an engine via a spur gear or sprocket 105 which drives a gear means or the like 106 respectively, located around and firmly attached to the grain/straw conveyor cylinder 3. This gear means 106 also is employed to drive gears 107 assuring the drive to the reel 108 and the knives 109. Extra driving elements for the reel and knives thus are not required.

In FIG. 9, a rotating conveying drum 110 is installed between the cutter bar 1 and the conveyor cylinder 3 in order to ensure an improvided flow of the cut material between cutter bar 1 and conveyor cylinder 3.

In FIG. 10 the rotating walker 13 of the grain/straw conveyor 3 additionally contains a piping system 111 designed to permit the passage and drying of moist grain. Through the threshing cylinder 8 acting as radial blower with its build-in air scoops 96 warm air is blown through this piping system 111 in the opposite direction of the passage of the moist grain. The moist grain is transported via the intake 112 to the internal conveying pipe 113 of the piping system 111. From there, it is taken via the internal auger 114 into the conveying pipe 115 which surrounds the internal conveying pipe 113. Inside that pipe 115 the material is fed by the internal auger 116 in the opposite direction to the direction of the internal conveying pipe 113. The passage of the moist grain is continued into the next bigger conveying pipes, in direction of the arrow 117 opposite to the direction of the air flow.

At the end of the piping system, the grains dried therein are separated by any applicable separation device. The grains are then passed along to the auger 11 which conveys them once more to the grain cleaning system.

It will thus be seen that the objects made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Now that the invention has been described,

What is claimed is:

1. A combine of the type designed to harvest grain/straw type crop, said combine comprising: conveyor cylinder means rotatably mounted on said combine, a cutter bar pivotally mounted adjacent to and along at least a portion of the axial length of said conveyor cylinder means, threshing means mounted adjacent to and in communication with both the conveyor cylinder means and the cutter bar, a first conveyor means mounted adjacent to both the conveyor cylinder means and the cutter bar and in communicating relation with the threshing means, control means including shoe means fixedly attached to the undersurface of said cutter bar and disposed thereon in ground engaging relation for regulating the height of said bar relative to the ground surface, whereby the crop being treated is severed by said cutting bar at a substantially consistent height and transported to and from said threshing means by said first conveyor means and said conveyor cylinder means respectively.

2. A combine as in claim 1 wherein said first conveyor means comprises at least one conveyor belt positioned at least in part between said cutter bar and said conveyor cylinder means, whereby said crop is conveyed to said threshing means adjacent to the exterior surface of said conveyor cylinder means.

3. A combine as in claim 2 wherein said first conveyor means further comprises a plurality of conveyor belts, at least two of which are of different length and each of which include a plurality of tine means mounted thereon to facilitate conveying of crop cut by said cutter bar.

4. A combine as in claim 1 wherein said conveyor cylinder means comprises second conveyor means mounted on its interior surface, said cylinder means including at least one open side arranged in communication with said threshing means, whereby grain/straw passes from said threshing means to said cylinder means.

5. A combine as in claim 1 wherein said threshing means comprises blower mean attached thereto, said threshing means including a cylinder rotatably mounted on said combine such that rotation thereof serves to aid in conveying the cut crop to said conveyor cylinder means by virtue of air flow created by said blower means.

6. A combine as in claim 1 further comprising a walker means movably mounted on the interior of said conveyor cylinder means, said walker means positioned to movably engage the crop within said conveyor cylinder means in such a manner and to separate grain from straw.

7. A combine as in claim 5 wherein said conveyor cylinder means comprises walker means of the rotary type mounted on the interior of said cylinder conveyor means including an air directing wall positioned to channel air from said threshing means from outer portions of said conveyor cylinder means interior inwards than said rotary walker means.

8. A combine as in claim 1 wherein said cutter bar is hingedly connected to said combine along an axis substantially parallel to the longitudinal axis of said cylinder conveyor means, whereby the height of said bar may be adjusted to regulate the cutting height relating to the surface over which the combine travels and the combine itself.

9. A combine as in claim 8 wherein said cutter bar is removably attached to said combine along said hinged axis.

10. A combine as in claim 1 wherein said control means further comprises lever means attached to said cutter bar, wire control means interconnected between said lever means and a list control assembly, whereby the height of said combine is regulated by movement of said cutter bar.

11. A combine as in claim 7 wherein said rotary walker means comprises a co-axial piping system defining a passage therein for the conveying of predetermined grain, said passage arranged between a flow path from the innermost pipe through the outermost pipe.

12. A combine as in claim 11 wherein said piping system is mounted on the interior of said conveyor cylinder means in communication with said threshing means such that air directed therefrom passes into said piping system, whereby said predetermined grain is directed.

13. A combine as in claim 1 further comprising drive means including gear means attached to the outer periphery of said conveyor cylinder means, gear means interconnected to other components of said combine such that rotation of said conveyor cylinder means causes driving of said other components.

* * * * *